July 15, 1958     S. M. WAAS     2,843,037
HOT DOG GRILL ASSEMBLY
Filed May 7, 1956     2 Sheets-Sheet 1
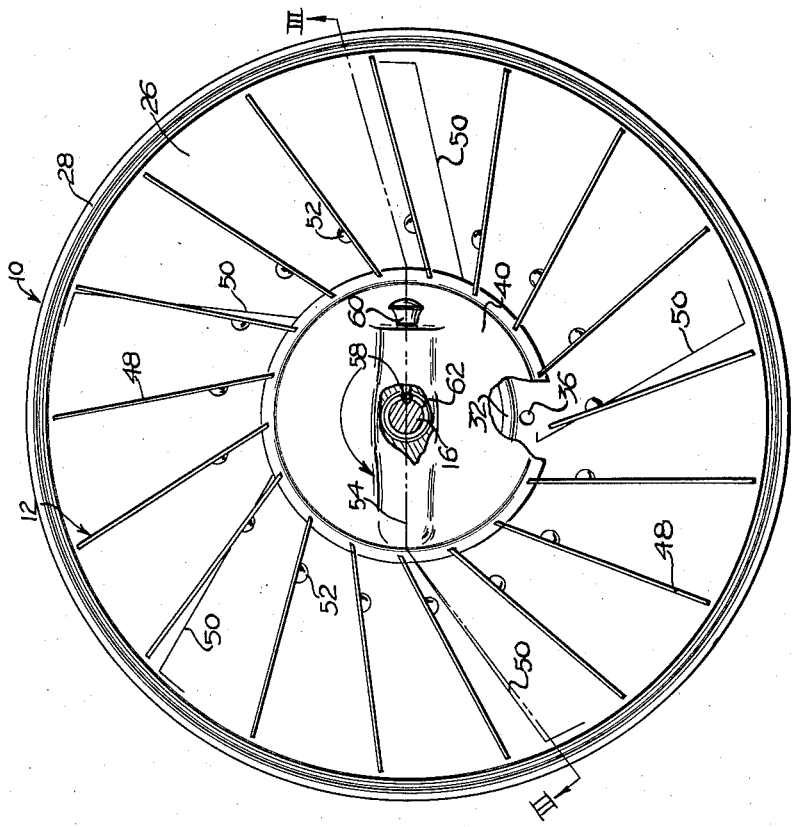
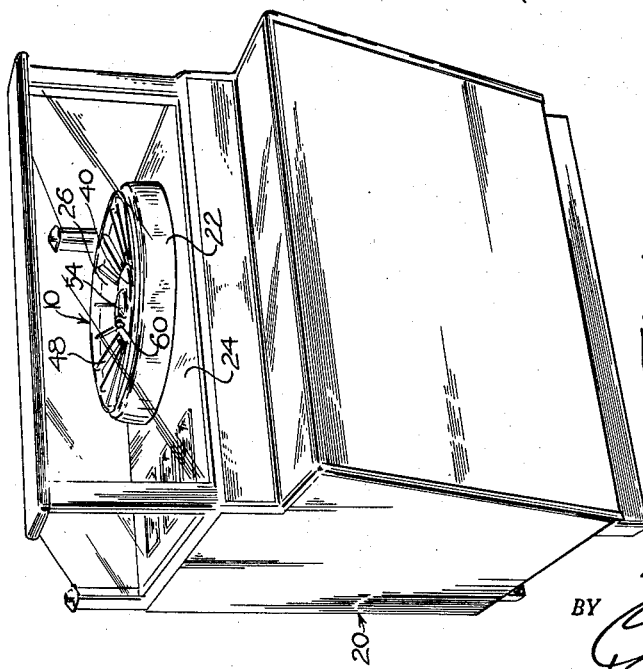
INVENTOR.
Samuel M. Waas
BY
ATTORNEY July 15, 1958 S. M. WAAS 2,843,037
HOT DOG GRILL ASSEMBLY
Filed May 7, 1956 2 Sheets-Sheet 2
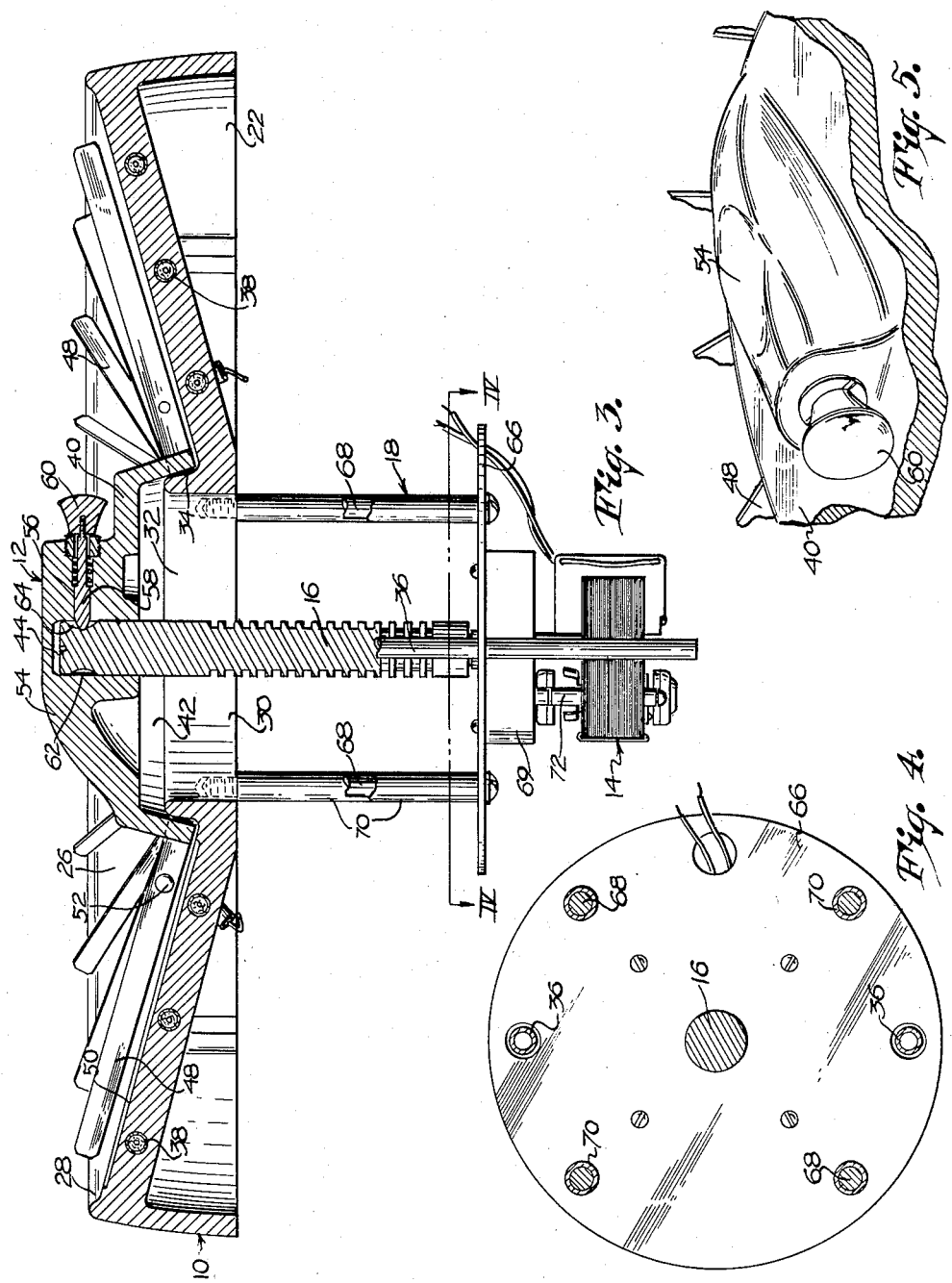
INVENTOR.
Samuel M. Waas
BY
ATTORNEY United States Patent Office 2,843,037
Patented July 15, 1958

2,843,037

HOT DOG GRILL ASSEMBLY

Samuel M. Waas, Kansas City, Mo., assignor to Manley, Inc., Kansas City, Mo., a corporation of Missouri Application May 7, 1956, Serial No. 583,117

6 Claims. (Cl. 99—423)

This invention relates to a cooking appliance and particularly to a grill assembly adapted especially for broiling wieners, frankfurters, hot dogs and the like, and has for its primary object the provision of structure for continuously advancing the articles to be heated along the grill in a circular path about a vertical axis in a manner to cause such elongated articles to rotate on their longitudinal axes and thereby be quickly and thoroughly heated throughout in a relatively short period of time.

It is the most important object of the instant invention to provide a cooker for food products broadly in the nature of a rotatable spit commonly employed in barbecue ovens but differing substantially therefrom in that the articles to be cooked are constantly moved or rolled along a heated surface, as distinguished from the principles of the spit wherein the food product is carried by sharpened prongs or the like and rotated in the air in spaced relationship to the source of heat.

Another important object of the instant invention is the provision of an appliance of the aforementioned character which is capable during operation of presenting a pleasing, interesting and animated effect, thereby enticing spectators to purchase the food product being exhibited to view.

A further object of the instant invention is the provision of various cooperating features in the assembly for inducing and assuring rotation of the articles about their longitudinal axes and which features include the roughness of the grill surface as compared with the smoothness of spoke-like elements utilized to advance the articles; the provision of a plurality of shoulders in the grill surface; the concave configuration of the grilling surface itself; the tangential arrangement of the said spoke elements; the provision of a shield on the hub of the rotatable structure for receiving one end of the food products; and the provision of protuberances on the spoke elements for reducing the extent of frictional contact of the food products with the spokes themselves.

An important feature of the instant invention relates to the inclusion of safety means for preventing damage to the prime mover for rotating the spoked structure, which includes a simple slip clutch arrangement operable whenever the product tends to become lodged between one of the spokes and the underlying grill surface.

A still further object of the present invention has to do with novel means of presenting a trough and a drain for receiving and carrying away grease emanating from the product as the same is being broiled.

Another object of the present invention is the provision of a cooking appliance employing rotatable structure as above indicated and which is readily removable from above the concave surface of the grill and readily detachable from its actuating shaft for cleaning, maintenance and repair as may become necessary or advisable.

In the drawings:

Figure 1 is a front perspective view of a hot dog grill assembly made according to my present invention;

Fig. 2 is an enlarged plan view of the grill entirely removed from the cabinet therefor, parts being broken away and in section for clearness;

Fig. 3 is an enlarged vertical cross-sectional view taken substantially on irregular line III—III of Fig. 2;

Fig. 4 is a transverse cross-sectional view taken on line IV—IV of Fig. 3; and

Fig. 5 is an enlarged fragmentary perspective view of the rotatable structure and particularly the hub thereof showing the manually manipulable knob of the releasable mechanism.

The basic components of the cooking appliance shown in the drawings include a grill broadly designated by the numeral 10, rotatable structure 12, a prime mover 14 for the structure 12, a drive shaft 16 operably interconnecting the structure 12 and the prime mover 14, support means 18 for the prime mover 14 and a cabinet broadly designated by the numeral 20 with which the various parts of the grill assembly are desirably associated.

The grill 10 is preferably cast from a suitable heat conducting material and is provided with an annular downturned flange 22 adapted to rest upon and/or be attached to table 24 forming a part of the cabinet 20, the cabinet 20 being hollow beneath the table 24 and being provided with an opening (not shown) for clearing the support means 18 as well as the shaft 16.

Grill 10 is provided with a concave upwardly facing surface 26 preferably surrounded by an uppermost and outermost article-retention bead 28, and a central perforation 30 within the grill 10 clears the operating shaft 16. An upstanding annular flange 32 concentric with the perforation 30 is cast integrally with the grill 10 and cooperates with the surface 26 in presenting an annular grease collecting trough 34 circumscribing the flange 32. The grease collected by the trough 34 is drained therefrom through provision of one or more drain tubes 36 communicating with the trough 34. Any suitable means may be provided for heating the grill 10 but it is to be preferred that there be provided an electric heating element 38 of any suitable character embedded within the grill 10 in the manner illustrated by Fig. 3 of the drawings.

The rotatable structure 12 includes a hollow hub 40 provided with a downturned annular skirt or shield 42 extending into the trough 34 in circumscribing relationship to the flange 32. The hub 40 is provided with a central downwardly facing cavity 44 rotatably receiving the shaft 16.

The shield 42 of hub 40 is slotted to receive the innermost ends of a plurality of flat, elongated spoke elements 48 welded or otherwise attached rigidly to the hub 40. The spoke elements extend upwardly and outwardly from the hub 40 as seen in Fig. 3, rendering the rotatable structure 12 of substantially the same configuration as the concave grill 10, and in Fig. 2 of the drawings it is seen that spoke elements 48 are disposed tangentially with respect to the hub 40 and particularly the axis of rotation thereof which is coincident with vertical axis of the shaft 16.

The uppermost surface 26 of the grill 10 is preferably roughened and provided with a plurality of shoulders 50 that are also tangentially arranged at substantially the same angle as the spokes 48. The structure 12 rotates anti-clockwise viewing Fig. 2, as indicated by the arrow, and it is seen that the innermost ends of the spokes 48 are in trailing relationship to the direction of rotation of the structure 12, whereas the outermost ends of the spokes 48 are in leading relationship to such direction of rotation, the shoulders 50 being similarly angled and facing the direction of rotation of structure 12. Each of the fingers or spokes 48 is provided with a small protuberance 52 on the leading face thereof adjacent the shield 42. It is to be preferred that the angle of inclination of the surface 26 be approximately 15° and the tangential angle of the spokes 48 be substantially 22½° to prevent the articles from being displaced from the greasy surface 26.

The hub 40 is provided with an elongated boss 54 provided with a bore 56 registering with the cavity 44 and within which is reciprocably mounted a spring loaded plunger 58 that engages shaft 16 and is provided with a finger control knob 60. An annular groove 62 formed in the shaft 16 in surrounding relationship thereto within the cavity 44 is provided with a transverse notch 64 that normally receives the innermost end of the plunger 54, providing a driving connection between the shaft 16 and the structure 12.

Support 18 includes a plate 66 attached to the grill 10 in depending relationship thereto through use of fasteners 68 and held spaced from the grill 10 by spacer tubes 70 threaded on the bolts or fasteners 68. A speed reducer 69 carried by the plate 66 therebeneath is operably connected with drive shaft 72 of the electric motor or the prime mover 14 and with the shaft 16, the plate 66 of course being perforated to accommodate not only the shaft 16 but the fasteners 68 and the drain tubes 36.

*Operation*

In operation, the hot dogs, frankfurters, wieners or similar food products are placed upon the inclined transversely flat concave surface 26 of the grill 10, it being preferred that but one article be associated with each spoke 48 respectively. Upon energization of the prime mover 14, the structure 12 is rotated continuously and slowly in the direction of the arrow shown in Fig. 2 through the speed reducer 70 and shaft 16 which is coupled with the hub 40 by the plunger 58 seated within the notch 64.

As the structure 12 rotates the articles are carried along the surface 26 by the spokes 48 and caused to rotate on their longitudinal axes with respect to the pushing fingers or spokes 48. Such rotation of the articles themselves is enhanced not only because of the relatively rough surface 26 but because of the fact that the fingers 48 as well as the protuberances 52 are relatively smooth, affording little frictional resistance to such rotation. In order to assure that the articles do, in fact, rotate periodically during each cycle of revolution, the shoulders 50 are provided and when the article falls into the elongated depression adjacent each shoulder 50 respectively there will be at least a partial rotation of the article with respect to its corresponding spoke 48.

The protuberances 52 tend to reduce the friction in that the article is thereby held away from the leading faces of the spokes 48 and contact the latter only at a single point adjacent the outermost ends of the articles and, therefore, the outermost ends of the spokes 48.

Furthermore, by virtue of the provision of the skirt or shield 42 on the hub 40, the innermost and lowermost ends of the articles being broiled are held out of engagement with the shoulder 32 and the articles thereby move with the hub 40 without appreciable drag. The skirt 42 also tends to hold the articles out of the collection of grease within the annular trough 34. In this respect it is seen that such grease readily and quickly flows downwardly and inwardly along the surface 26 into the trough 34 and hence to a point of collection by way of the drain tubes 36.

The inclination of the surface 26 as well as the tangential arrangement of the spokes 48 tend to move the articles toward the shield 42 of hub 40 and the bead 28 contributes additionally to avoidance of outward movement of the articles to a point where they might become displaced with respect to the grill 10.

In the event the articles tend to become jammed between the lowermost edges of the spokes 48 and the surface 26 or, for any other reason, fail to move along the surface 26 and rotate with respect thereto in a smooth, uninterrupted manner, damage to the prime mover 14 is avoided by virtue of the slip clutch arrangement provided at the uppermost end of shaft 16 within the cavity 44. Such jamming of the free rotation of the structure 12 causes the plunger 52 to move out of the notch 64 against the action of the spring which biases the plunger 58 inwardly toward the shaft 16, whereupon the shaft 16 rotates freely within the cavity 44 as the plunger 58 rides in the annular groove 62. By the time shaft 16 has rotated a full cycle, the operator will have had opportunity to rectify the jamming situation and plunger 58 will automatically reseat within the notch 64 to operably interconnect the structure 12 and the shaft 16.

It is to be noted also that the entire unit 12 may be quickly and readily removed from the shaft 16 and the grill 10 by pulling outwardly upon the finger knob 60 and lifting the hub 40, as well as the fingers 48 upwardly, whereupon the unit 12 as well as the surface 26 of the grill 10 may be quickly and readily cleaned.

It is now seen that a large number of articles may be quickly broiled in a relatively short period of time because of the fact that the grill 10 may be maintained at a high temperature through use of the heating element 38, since there is little danger of burning or scorching because of the continuous movement of the articles, not only around the grill 10 but with respect to the axes of the elongated articles themselves. Facing shoulders 50 toward the direction of rotation of structure 12 prevents the articles from being pinched between fingers 48 and surface 26. Provision of protuberances 52 prevent sticking of the articles to fingers 48, but any tendency to stick is overcome by the action of shoulders 50.

Having thus described the invention, what is claimed as new and desired to be secured by Letters Patent is:

1. A cooking appliance comprising a grill adapted to be heated and having a concave, upwardly facing surface for receiving elongated articles to be heated thereby; and rotatable structure above the surface and provided with a hub and a plurality of spoke elements extending outwardly from the hub and engageable with the articles for advancing the latter along said surface on a circular path of travel about the axis of rotation of the hub while rotating the articles on their longitudinal axes, said spoke elements being located in positions tangential to said axis of rotation of the hub with the innermost portions thereof in trailing relationship to the direction of rotation of the hub whereby said concave surface and the spoke elements cooperate to cause the articles to be moved inwardly toward said axis as the same are advanced.

2. A cooking appliance as set forth in claim 1 wherein said grill is provided with a centrally disposed, annular, grease-collecting trough, said hub being provided with an annular shield surrounding and spaced above said trough for maintaining said articles out of the grease collected in said trough as the same are moved toward the hub during rotation and advancement thereof.

3. A cooking appliance as set forth in claim 1 wherein each of said spoke elements is provided with an article-engaging protuberance for enhancing rotation of the articles relative to the spoke elements as said structure is rotated.

4. A cooking appliance as set forth in claim 1 wherein said surface is provided with a plurality of shoulders for enhancing rotation of the articles relative to the spoke elements as said structure is rotated.

5. A cooking appliance as set forth in claim 1 wherein said spoke elements are appreciably smoother than said surface of the grill for enhancing rotation of the articles relative to the spoke elements as said structure is rotated.

6. A cooking appliance comprising a centrally perforated grill adapted to be heated and having a concave, upwardly facing surface for receiving elongated articles to be heated thereby; and rotatable structure above said surface, provided with a hub, a plurality of spoke elements extending outwardly from the hub and engageable with the articles for advancing the latter along said surface on a circular path of travel about the axis of rotation of the hub while rotating the articles on their longitudinal axes, said spoke elements being located in positions tangential to said axis of rotation of the hub with the innermost portions thereof in trailing relationship to the direction of rotation of the hub whereby said concave surface and the spoke elements cooperate to cause the articles to be moved inwardly toward said axis as the same are advanced, a drive shaft extending through the perforation and having one end thereof disposed within the hub, there being a circumferential groove in said one end of the shaft and a notch in said groove, a pin reciprocably mounted on the hub and engageable with the shaft within said notch, and means for biasing said pin into the notch.

References Cited in the file of this patent

UNITED STATES PATENTS

| | | |
|---|---|---|
| 1,599,556 | Cook | Sept. 14, 1926 |
| 2,227,608 | Tinnerman | Jan. 7, 1941 |
| 2,631,525 | Finizie | Mar. 17, 1953 |